United States Patent [19]

Adamson et al.

[11] Patent Number: 5,761,448
[45] Date of Patent: Jun. 2, 1998

[54] PHYSICAL-TO-LOGICAL BUS MAPPING SCHEME FOR COMPUTER SYSTEMS HAVING MULTIPLE PCI BUS CONFIGURATION

[75] Inventors: Alan P. Adamson, San Diego, Calif.; Thomas M. Sandison, Irmo; Charles E. Williams, Lexington, both of S.C.

[73] Assignee: NCR Corporation, Dayton, Ohio

[21] Appl. No.: 697,809

[22] Filed: Aug. 30, 1996

[51] Int. Cl.[6] .................................................. G06F 13/40
[52] U.S. Cl. ............................................ 395/284; 395/308
[58] Field of Search ................................... 395/282, 283, 395/284, 308, 287, 828, 829, 830, 651, 652, 653, 309

[56] References Cited

U.S. PATENT DOCUMENTS

| | | | |
|---|---|---|---|
| 5,220,654 | 6/1993 | Benson et al. | 395/275 |
| 5,321,814 | 6/1994 | Barajas et al. | 395/200 |
| 5,446,869 | 8/1995 | Padgett et al. | 395/500 |
| 5,524,269 | 6/1996 | Hamilton et al. | 395/829 |
| 5,542,055 | 7/1996 | Amini et al. | 395/281 |

*Primary Examiner*—Glenn A. Auve
*Attorney, Agent, or Firm*—James M. Stover

[57] ABSTRACT

A Plug-and-Play (PnP) configuration driver initilization routine and PnP configuration utility for use in PCI bus architectures supporting dynamic I/O bus configurations. The PnP configuration driver includes a logical-to-physical PCI bus mapping scheme maintaining a PCI bus mapping table, and creating a logical-to-physical map table at start-of-day. PCI device drivers access devices through the logical bus numbers, thereby avoiding errors resulting when physical bus numbers change as a result of the addition or removal of buses within a computer system supporting dynamic I/O bus configurations.

13 Claims, 9 Drawing Sheets

PHYSICAL-TO-LOGICAL BUS MAPPING SCHEME FOR COMPUTER SYSTEMS HAVING MULTIPLE PCI BUS CONFIGURATION

The present invention relates to Peripheral Component Interconnect (PCI) based computer systems and, more particularly, to a method for assigning logical bus numbers to multiple PCI busses within a computer system.

BACKGROUND OF THE INVENTION

Many computer system operating systems, such as NCR Corporation UNIX MP-RAS operating system, Microsoft Corporation WINDOWS NT operating system, and SCO Inc. UnixWare 2.0 operating system access peripheral devices based on their I/O Bus number, Controller number, PUN (Physical Unit Number), and LUN (Logical Unit Number). As long as these four parameters are held constant from one hardware configuration to another, an operating system will be able to access any previously installed device with a direct correlation between the operating system minor number and the physical address. This is the case for Micro Channel Architecture (MCA) and Enhanced Industry Standard Architecture (EISA) I/O Bus architectures which have a fixed number of I/O Busses. However, this is not the case for PCI Bus architectures which support dynamic I/O Bus configurations. When a PCI-to-PCI bridge is added to a system, system Basic Input/Output Software (BIOS) can, and currently does, reassign I/O Bus numbers possibly invalidating previously installed devices that were addressed based on previously assigned I/O Bus number. This is one of the many Plug-and-Play (PnP) issues that operating systems will have to address. Reassignment of I/O bus numbers by the system BIOS can result in a no-boot condition, wherein a boot device may not be recognized by the system.

The Peripheral Component Interconnect (PCI) architecture uses a connector, referred to above as a bridge, to connect two computer busses together to enable communication between the busses. Several types of bridges may exist in a system, such as: a host microprocessor to PCI bus bridge, a PCI bus to standard (ISA) bus, and PCI to PCI bridges. FIG. 1 provides a simple block diagram illustration of a computer system including multiple busses connected through various types of bridges.

The computer system illustrated in FIG. 1 includes a central processor 101 and main memory 103 connected by a memory bus 105. Two PCI busses, PCI Bus 0 and PCI Bus 4 are shown connected through Bridge 0 and Bridge 4, respectively, to memory bus 105. Additional PCI busses PCI Bus 1 and PCI Bus 3, and a standard bus 117 are connected in a hierarchical arrangement through Bridge 1, Bridge 3 and bridge 127 to PCI Bus 0. PCI Bus 2 is connected with PCI Bus 1 via Bridge 2. A sixth PCI bus, PCI Bus 5 is connected with PCI Bus 4 via Bridge 5.

A multiple bus architecture, such as shown in FIG. 1, is used for several reasons, e.g., to isolate the bandwidth of a high speed device from the rest of the system, to allow an intelligent controller to have a local PCI bus, or to support more devices than can be directly connected to one PCI bus. As will be explained further below, there exists two methods for interconnecting multiple PCI busses—as peers or hierarchically.

In FIG. 1, Bridge 0 and Bridge 4 are peers, as are Bridge 1 and Bridge 3. Bridge 0, Bridge 1, and Bridge 2 are arranged hierarchically. The number of each PCI-to-PCI bridge corresponds to the PCI bus beneath it. This hard-coded bridge numbering convention allows software to operate transparently across multiple PCI busses. The design of a bus configuration, whether peer or hierarchical configurations, is determined through evaluation of factors ranging from the I/O patterns of the system to the electrical loading characteristics of the processor bus. If I/O patterns tend to be from one PCI device to another, then a hierarchical configuration makes sense because I/O traffic occurs away from the processor bus. However, having more than two levels of hierarchy does not provide much benefit and should be avoided. If most I/O traffic is directed into and out of memory, then peer busses may make the most sense. However, peer busses require multiple bridges on the processor bus that may affect bus loading. Another factor to consider is cost; host bridges are more expensive than PCI-to-PCI bridges.

In accordance with the standard convention for numbering PCI busses, the first PCI Bus found in the system is assigned number 0. This is typically the first PCI bus off the system bus to PCI bus bridge. Then a slot by slot search for a bridge on PCI Bus 0 is made until a bridge found. If a PCI-to PCI bridge is found, the PCI bridge and connected PCI bus are assigned the next PCI number. The newly assigned bus is thereafter searched slot by slot for bridges. When all PCI slots have been searched, the search drops back to the parent PCI bus and the search continues on the next slot. Upon completion of all PCI Bus 0 slots, a search is made for any peer PCI Busses. If a peer is found the peer bus is assigned the next PCI number and the recursive search continues until all PCI busses are found.

As previously stated, the PCI architecture allows a user to change the hardware configuration, thereby changing the physical PCI bus numbering. However, the UNIX MP-RAS operating system, WINDOWS NT operating system, and UnixWare 2.0 operating system use the PCI Bus number as a means of addressing PCI devices or bus agents. Therefore, when an adapter card with a PCI-to-PCI bridge is inserted into or removed from the system, the physical PCI bus numbers are reassigned, and previously created minor numbers generated to address PCI devices or bus agents no longer correctly map to previously installed devices.

Take for example, a system including peer PCI busses with a boot/root device installed on the second PCI peer bus. FIG. 2 shows the backpanel 201 for such a system. The backpanel is seen to include card slots for a first peer PCI bus PEER-0, several card slots for an EISA bus, card slots for a second peer PCI bus PEER-1, and a boot controller 203 associated with PCI bus PEER-1. A minor number, utilized by the system to identify the boot device, could be represented by the value c100t0d0s0, where c100 represents PCI bus PEER-1, controller 0, and channel 0.

Should a host adapter that implements a PCI-to-PCI Bridge, such as an Adaptec AHA-3940 Host Adapter 305, be installed into PCI bus PEER-0, as shown in FIG. 3, system PCI configuration software (BIOS) will remap the PCI Busses so that the boot/root controller, formerly addressed by minor number c100t0d0s0, would have to be addressed by the minor number c200t0d0s0. This situation may require the system user to reinstall the operating system.

OBJECTS OF THE INVENTION

It is therefore an object of the present invention to provide a new and useful bus addressing scheme for a computer system including multiple busses.

It is another object of the present invention to provide a new and useful method for avoiding errors which would otherwise result when physical bus numbers change as a result of the addition or removal of buses within a computer system supporting dynamic I/O bus configurations.

It a further object of the present invention to provide a new and useful method for assigning logical bus numbers to the physical busses within a computer system supporting dynamic I/O bus configurations.

It is an additional object of the present invention to provide such a method which establishes a logical-to-physical PCI bus map to maintain a consistent bus addressing scheme within the computer system.

It is a further object of the present invention to provide such a method which includes a new and useful utility for updating the logical-to-physical bus map following the addition or removal of a bus from the computer system.

SUMMARY OF THE INVENTION

There is provided, in accordance with the present invention, a method for addressing bus devices within a computer system supporting dynamic I/O bus configurations wherein the computer system assigns a physical bus number to each bus within the system during system boot-up or start-of-day operations. The method comprising the steps of (1) assigning a distinct logical bus number to each bus within the computer system, the logical bus number assigned to each bus remaining unchanged following a bus configuration alteration producing a change in the physical bus numbers assigned to said busses, such as the addition or removal of a bus; and (2) generating an address value or minor number for each one of the bus devices, the minor number including a portion identifying the logical bus number of the bus to which the one of the bus devices is connected.

In the described embodiment, the method generates and saves a bus mapping table including a field identifying the physical bus numbers of each bus in the computer system, a field identifying the logical bus number of each bus in said computer system, and additional information such bus type (PCI peer, PCI bridge, EISA, etc.), parent bus number, and parent bus slot number. During system start of day, the current physical bus numbers assigned by the computer system to the busses during system boot-up are compared to the physical bus numbers contained within the bus mapping table to generate a logical-to-physical map table for translating logical bus numbers to current physical bus numbers. Thereafter, bus devices addressed through use of minor numbers based upon logical bus numbers can be addressed successfully even though the physical bus number associated with the bus device has been changed.

A utility for updating the contents of the bus mapping table is also provided by the present invention.

The above and other objects, features, and advantages of the present invention will become apparent from the following description and the attached drawings.

DETAILED DESCRIPTION OF THE PREFERRED EMBODIMENT

Figure 1:
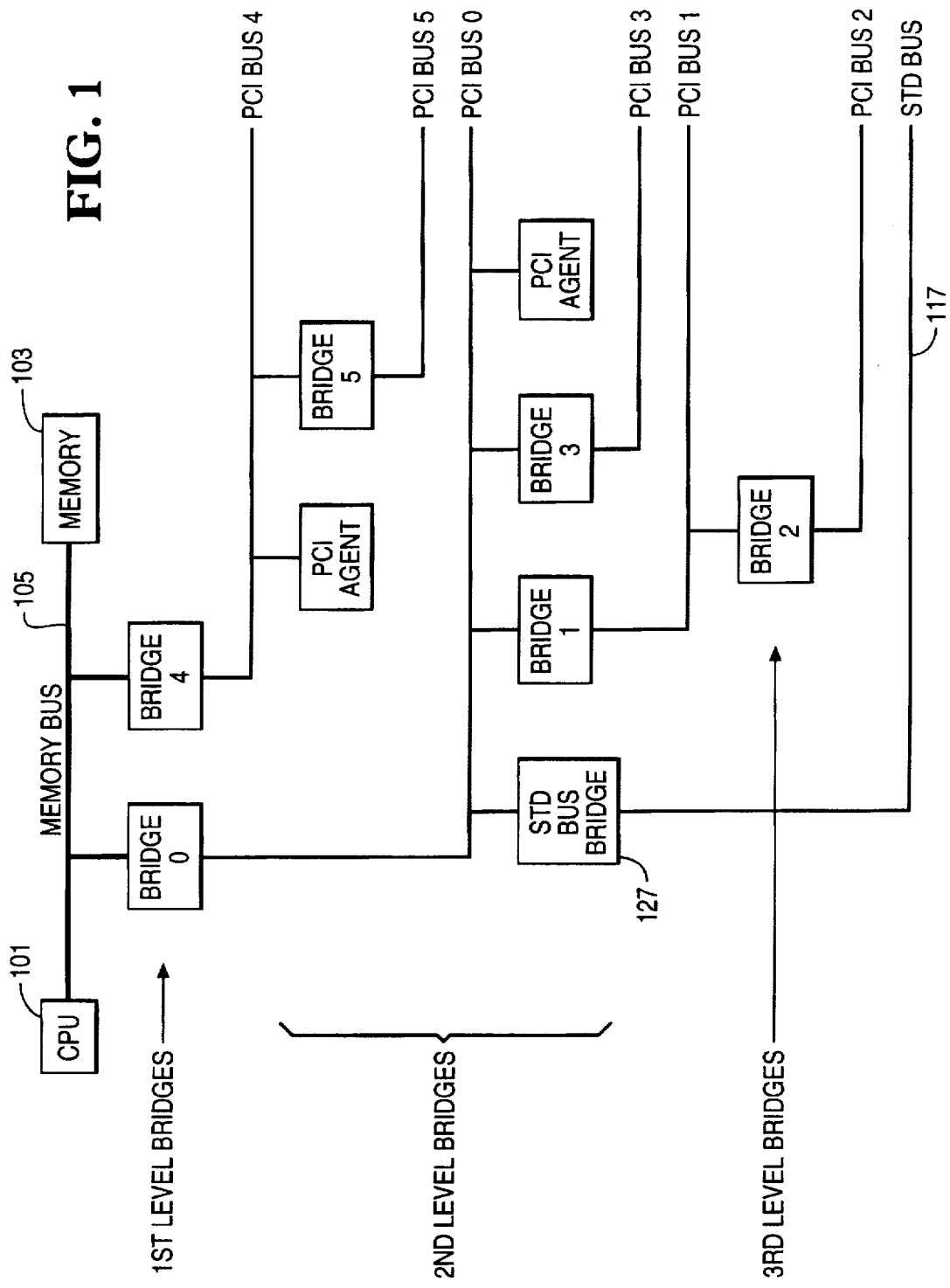
FIG. 1 is a simplified block diagram of a computer system employing peer and hierarchical PCI busses, as well as standard non-PCI busses.
Figure 2:
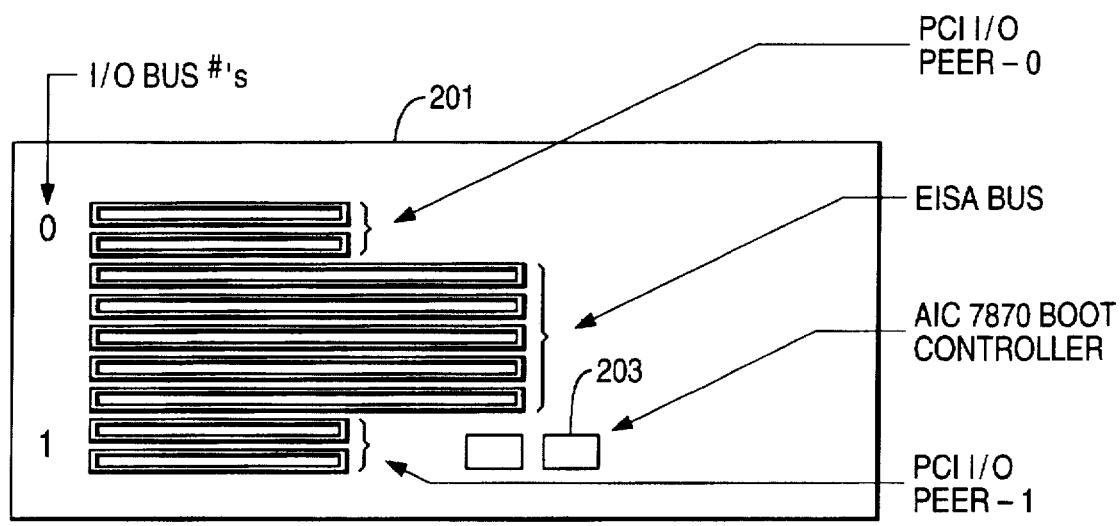
FIG. 2 is an illustration of a backpanel for a computer system including two peer PCI busses with a boot/root device installed on the second PCI peer bus.
Figure 3:
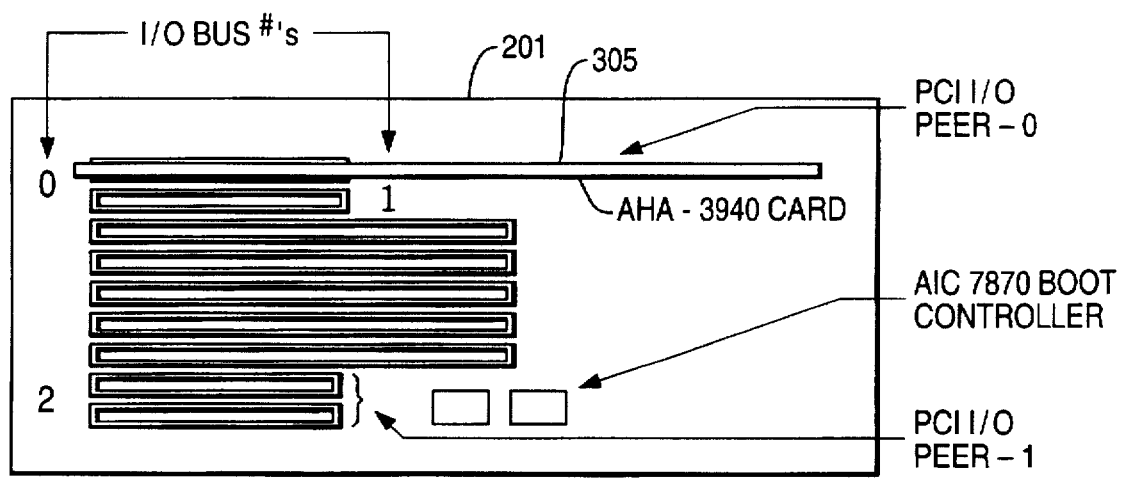
FIG. 3 is an illustration of the backpanel of FIG. 2, further including the connection of a PCI-to-PCI bridge to the first PCI peer bus.

FIGS. 2 and 3, discussed earlier, illustrate the manner in which PCI bridge and bus numbers and minor numbers are determined in a system including multiple PCI busses. According to the above discussion concerning FIGS. 2, the minor number for a boot/root device installed on the second PCI bus PEER-1 could be represented by c1αβt0d0s0, where c1αβ represents I/O Bus 1, controller α, and channel β. In many current systems, the operating system utilizes a mapping scheme which uses the physical PCI bus number as the I/O bus number. This mapping scheme is illustrated in FIGS. 4 and 5 for the systems shown in FIGS. 2 and 3, respectively.

Figure 4:
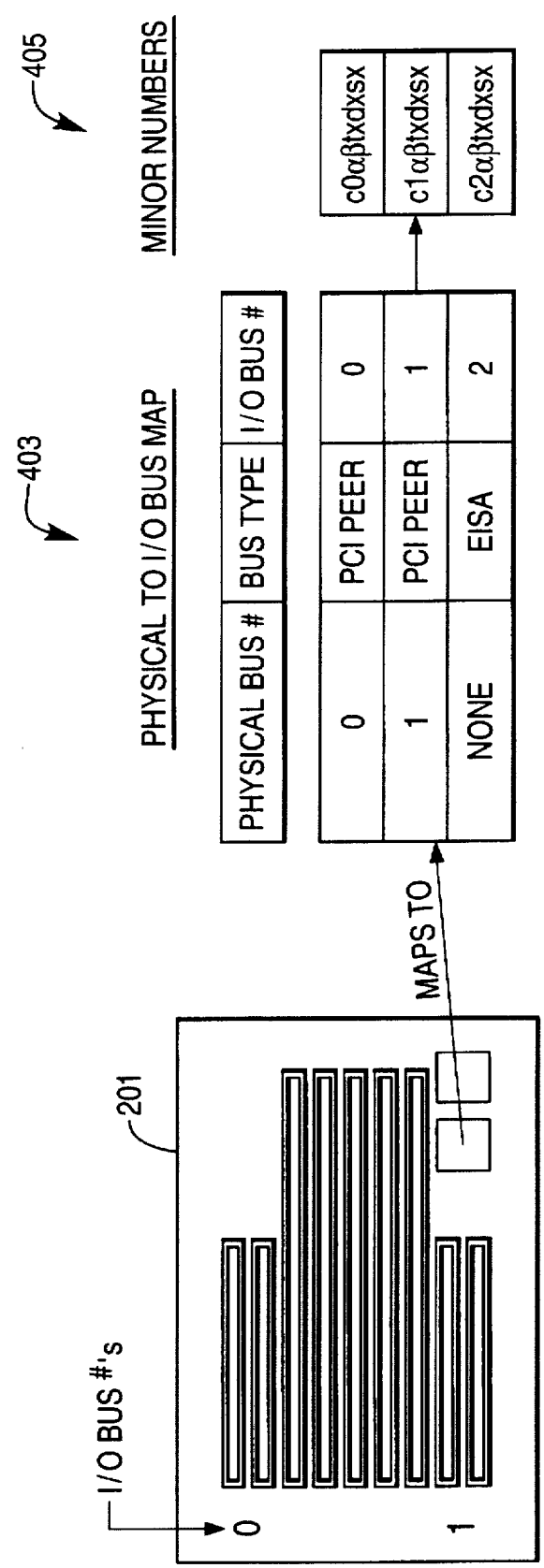
FIG. 4 is an illustration of the backpanel of FIG. 2, together with a table illustrating physical to I/O bus mapping and the generation of minor numbers identifying locations of devices residing on the busses.

FIG. 4 shows backpanel 201 of FIG. 2, together with a table 403 illustrating physical to I/O bus mapping and the generation of minor numbers identifying locations of devices residing on the busses. It is seen that the physical bus numbers for the two PCI peer busses, 0 and 1, translate directly to I/O bus numbers 0 and 1, and to minor numbers c0αβt0d0s0 and c1αβt0d0s0, respectively.

Figure 5:
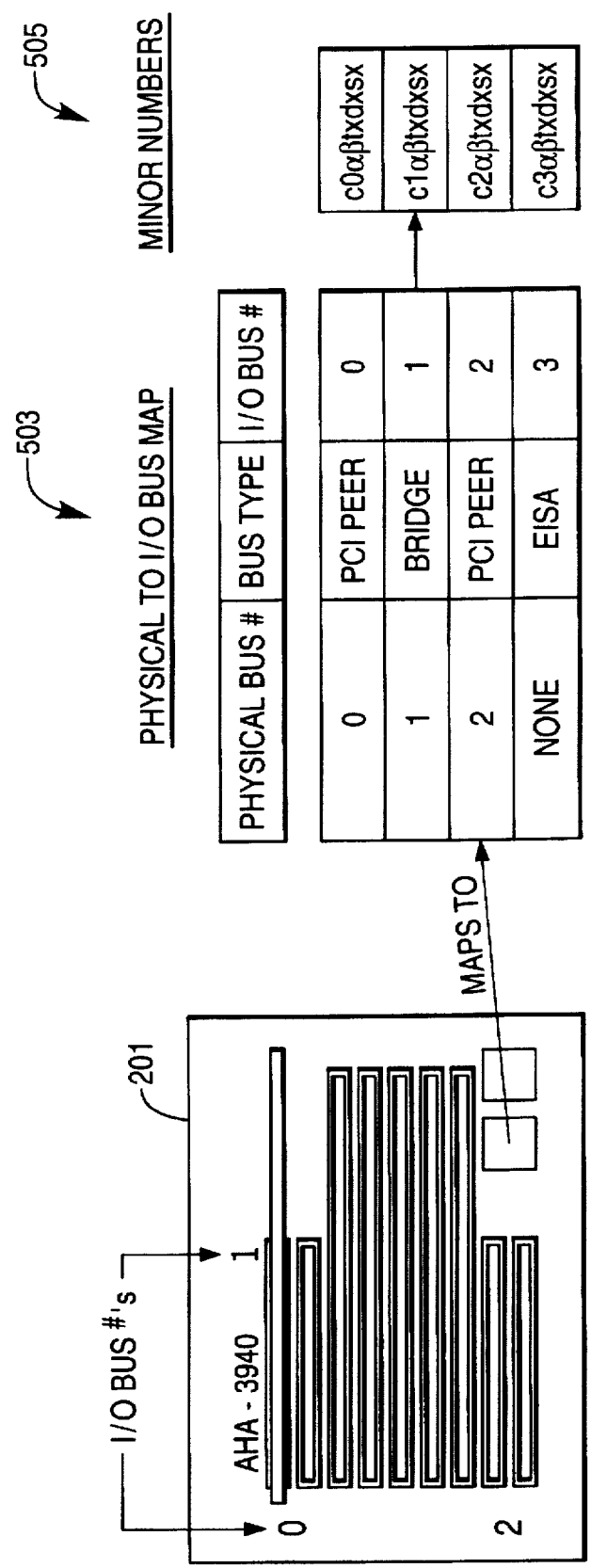
FIG. 5 is an illustration of the backpanel of FIG. 3, together with a table illustrating physical to I/O bus mapping and the generation of minor numbers identifying locations of devices residing on the busses.

Similarly, FIG. 5 shows the backpanel of FIG. 3 and a table 503 illustrating physical to I/O bus mapping for the system as shown. As discussed earlier, the system illustrated in FIG. 5 includes a host adapter that implements a PCI-to-PCI Bridge plugged into the bus PCI PEER-0. The PCI Configuration Software(BIOS) remaps the PCI Bus Numbers so that PCI bus PEER-0 is assigned physical bus number 0, the new PCI bus connected via the PCI-to-PCI bridge to PCI PEER-0 is assigned physical bus number 1, and the PCI bus PEER-1 is assigned physical bus number 2. Table 503 shows that the physical bus numbers for these three PCI busses translate directly to I/O bus numbers 0, 1 and 2, and to minor numbers c0αβt0d0s0, c1αβt0d0s0, and c2αβt0d0s0, respectively. As discussed earlier, a boot/root controller residing on bus PCI PEER-1 and addressed by minor number c1t0d0s0 prior to installation of the PCI-to-PCI bridge to PCI PEER-0, would no longer be accessible by that minor number following the installation of the PCI-to-PCI bridge to PCI PEER-0.

PCI Configuration Driver

To solve the PCI bus numbering problem identified above, a physical-to-logical PCI bus mapping scheme is provided by the present invention. A PCI Configuration Driver has been developed to effectuate all PCI Bus physical-to-logical conversions by detecting changes in configurations and prevent the operating system from becoming unbootable. At the heart of the PCI Configuration Driver is a PCI Bus Mapping Table which resides in a file referred to as the PCI Configuration Driver space.c file. The table includes the five fields shown in the sample bus mapping table provided below. Descriptions of the five fields shown are provided following the table.

| PCI Bus Mapping Table | | | | |
|---|---|---|---|---|
| Logical Bus Number | Physical Bus Number | Parent Bus Number | Slot Number | Bus Type |
| 0 | 0 | 0 | 0 | PEER |
| 1 | 1 | 0 | 0 | PEER |
| 2 | None | 0 | 0 | EISA |

Logical Bus Number—This number is used by the PCI device drivers to map to devices on a specific PCI Bus.

Physical Bus Number—This is the number assigned to a PCI Bus by the PCI Configuration Software.

Parent Bus Number—This is the physical PCI Bus number that the PCI-to-PCI bridge is configured on.

Slot Number—This is the slot number of the Parent Bus that the Bridge is located.

Bus Type—This describes the type of I/O bus that is found off the PCI Bridge.

At start-of-day, i.e., at system boot-up, the PCI Configuration Driver init routine compares the actual hardware configuration of the system to the PCI Bus Mapping Table to create a Logical-to-Physical Map Table, as illustrated below. A description of the three fields illustrated is provided following the table.

| Logical-to-Physical Map Table | | |
|---|---|---|
| Array index = Logical Number | Bus Type | Physical Number |
| 0 | PCI-Peer | 0 |
| 1 | PCI-Peer | 1 |
| 2 | EISA-Bus | None |

Logical Bus Number—This number is used by the PCI device drivers to map to devices on a specific PCI Bus.

Bus Type—This describes the type of I/O bus that is found off the PCI Bridge.

Physical Bus Number—This is the number assigned to a PCI Bus by the PCI Configuration Software.

The Logical Bus Number is utilized to maintain a consistent PCI Bus addressing scheme while PCI Busses are added and removed from the system. PCI Device Drivers directly access the Logical-to-Physical map to acquire a Physical Bus Number and Bus Type. The PCI Device Drivers use the Logical Bus Numbers as their I/O Bus Numbers, therefore all previously built minor numbers will properly address corresponding previously installed devices. All inserted or removed PCI Busses are flagged as non-configured PCI busses and added to an Unconfigured PCI Bus Table.

| Unconfigured PCI Bus Table | | | |
|---|---|---|---|
| PCI# | Parent Bus Number | Slot Number | Add or Deleted |

PCI Number—This is the number assigned to a PCI Bus by the PCI Configuration Software.

Parent Bus Number—This is the physical PCI Bus number that the PCI-to-PCI bridge is configured on.

Slot Number—This is the slot number of the Parent Bus that the Bridge is located in.

Added_or_Deleted—This describes if the PCI bus was added into the hardware system configuration but not in the PCI Bus Mapping Table, or if there is an entry in the PCI Bus Mapping Table but the hardware PCI Bus has been removed.

Figure 6:
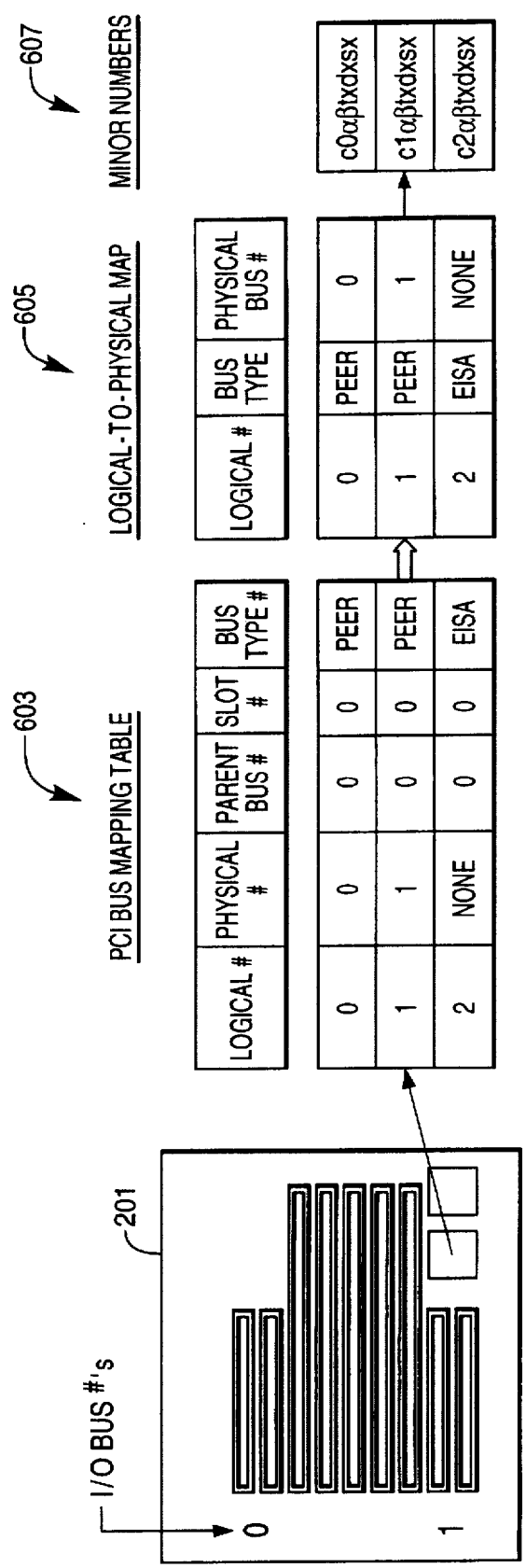
FIG. 6 is an illustration of the backpanel of FIG. 2, together with a PCI Bus Mapping Table and a Logical-to-Physical Map Table generated in accordance with the present invention.

From the previous example, a boot/root device installed on the second PCI peer bus, PCI PEER-1, may have a minor number represented by c100t0d0s0, where c100 represents I/O Bus 1, controller 0, and channel 0. FIG. 6 shows the backpanel of FIG. 2, together with PCI Bus Mapping Table 603 and Logical-to-Physical Map Table 605 which would be generated utilizing the system described herein for generating logical PCI bus numbers. It is seen that the physical bus numbers for the two PCI peer busses, 0 and 1, translate to logical I/O bus numbers 0 and 1, and to minor numbers c0αβt0d0 s0 and c1αβt0d0s0, respectively. The minor number c2αβt0d0s0 corresponds to the EISA bus.

Figure 7:
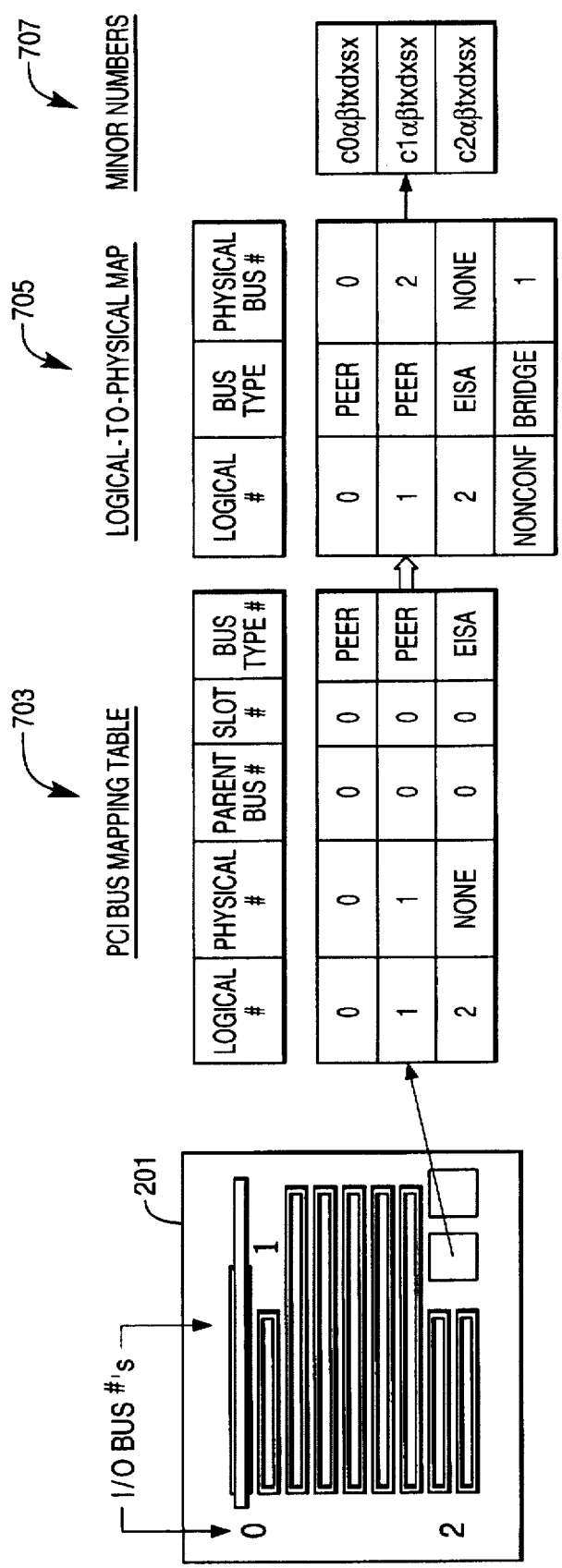
FIG. 7 is an illustration of the backpanel of FIG. 3, together with a PCI Bus Mapping Table and a Logical-to-Physical Map Table generated through use of the PCI Configuration Driver init routine of the present invention.

Following installation of a PCI-to-PCI host adapter into bus PCI PEER-0 as shown in FIG. 3, and prior to execution of the PCI Configuration Utility discussed below, the PCI Bus Mapping Table, Logical-to-Physical Map Table, and minor numbers corresponding to the system busses would be as shown in FIG. 7. As is shown by Logical-to-Physical Map Table 705 and minor numbers table 707, the peer PCI busses PCI PEER-0 and PCI PEER-1 maintain the same logical bus numbers and minor numbers as is shown in FIG. 6.

During execution of the PCI Configuration Driver init routine the PCI Bus Mapping Table is compared to the hardware configuration. The logical number of the PCI busses is maintained so that the boot/root Controller residing on PCI PEER-1 would still be addressed by the minor number c100t0d0. A Configuration Warning, such as is shown immediately below, is provided to the system user informing the user to run the PCI Configuration Utility.

| Warning | A PCI Bus was added into the hardware system configuration on PCI Bus 0, Slot 1 Please run the PCI Configuration Utility to add this device |
|---|---|

Figure 8:
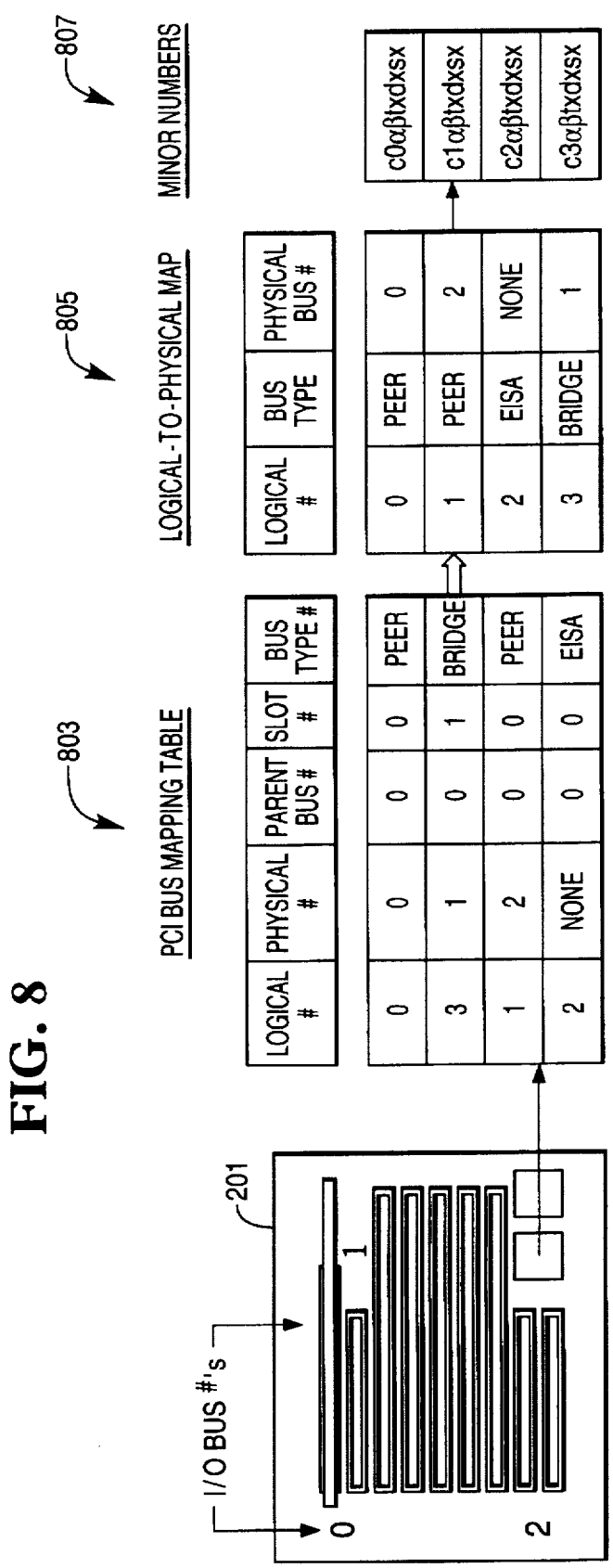
FIG. 8 is an illustration of the backpanel of FIG. 3, together with a PCI Bus Mapping Table and a Logical-to-Physical Map Table generated through use of the PCI Configuration utility of the present invention.

Following addition of the new PCI bus and execution of the PCI Configuration Utility, the PCI Bus Mapping Table, Logical-to-Physical Map Table and minor numbers would appear as is shown in FIG. 8.

PCI Configuration Driver Supported Functions

Descriptions of PCI Configuration Driver supported functions, identified by bold italicized type, together with pseudo-code listings for those functions are provided below.
PCI_Init( )
Description This function is called once at the start-of-day. It compares the hardware configuration to the PCI Bus Mapping Table that reside in the PCI Configuration Driver space.c file. This function copies the current PCI Bus Mapping Table into kernel memory space and modify it while creating two other tables: the Logical-to-Physical Map and the Unconfigured PCI Bus Table. The Logical-to-Physical Map is used by PCI Device drivers to map the logical PCI Bus Numbers to physical PCI Bus Numbers. The Unconfigured PCI Bus Table is used by the PCI Configuration Utility.

Logical input parameters:
none
Return Codes
none.

Figure 9A:
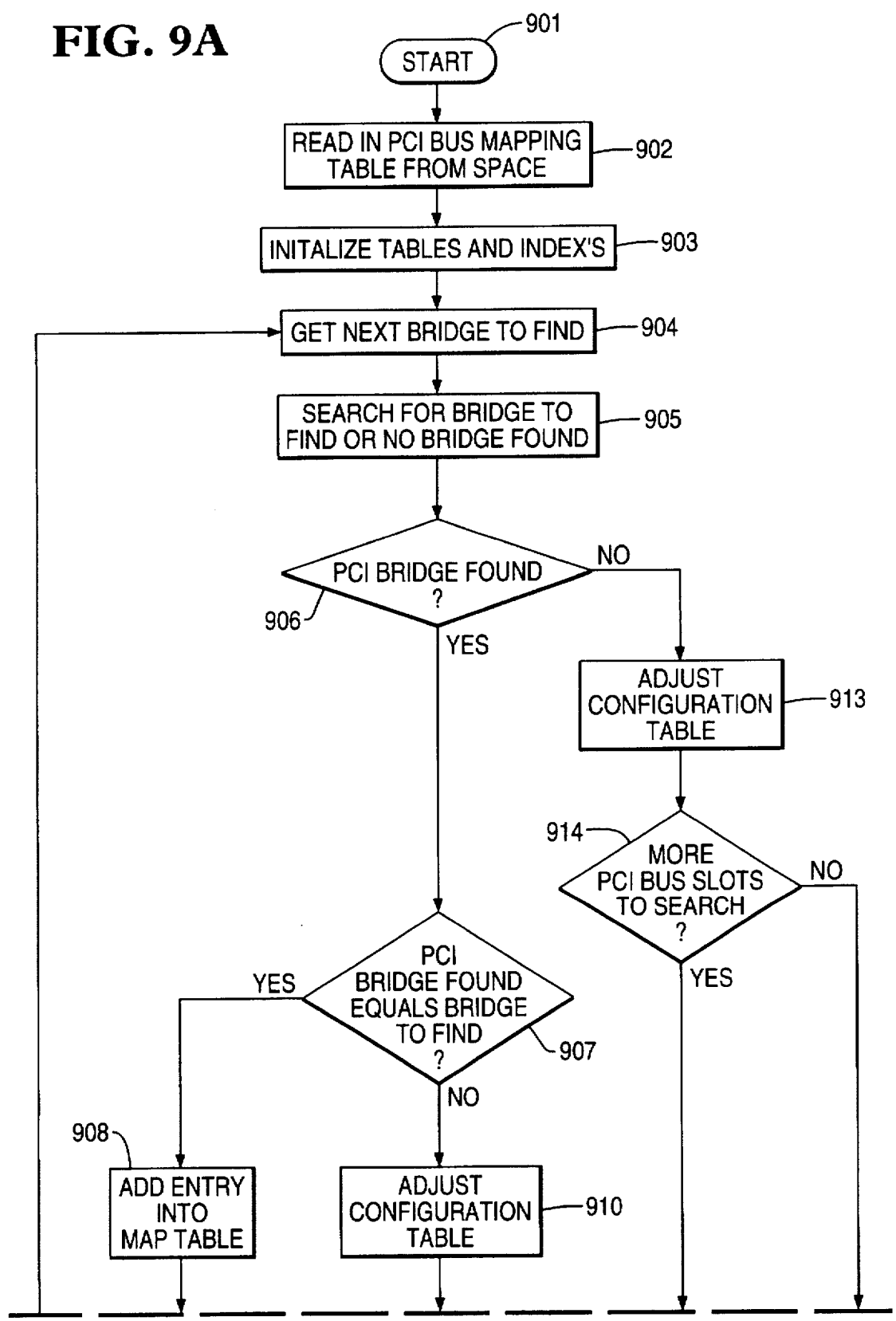
FIGS. 9A and 9B provide a flowchart illustrating the operation of the PCI Configuration init routine, PCI_Init ( ).
Figure 9B:
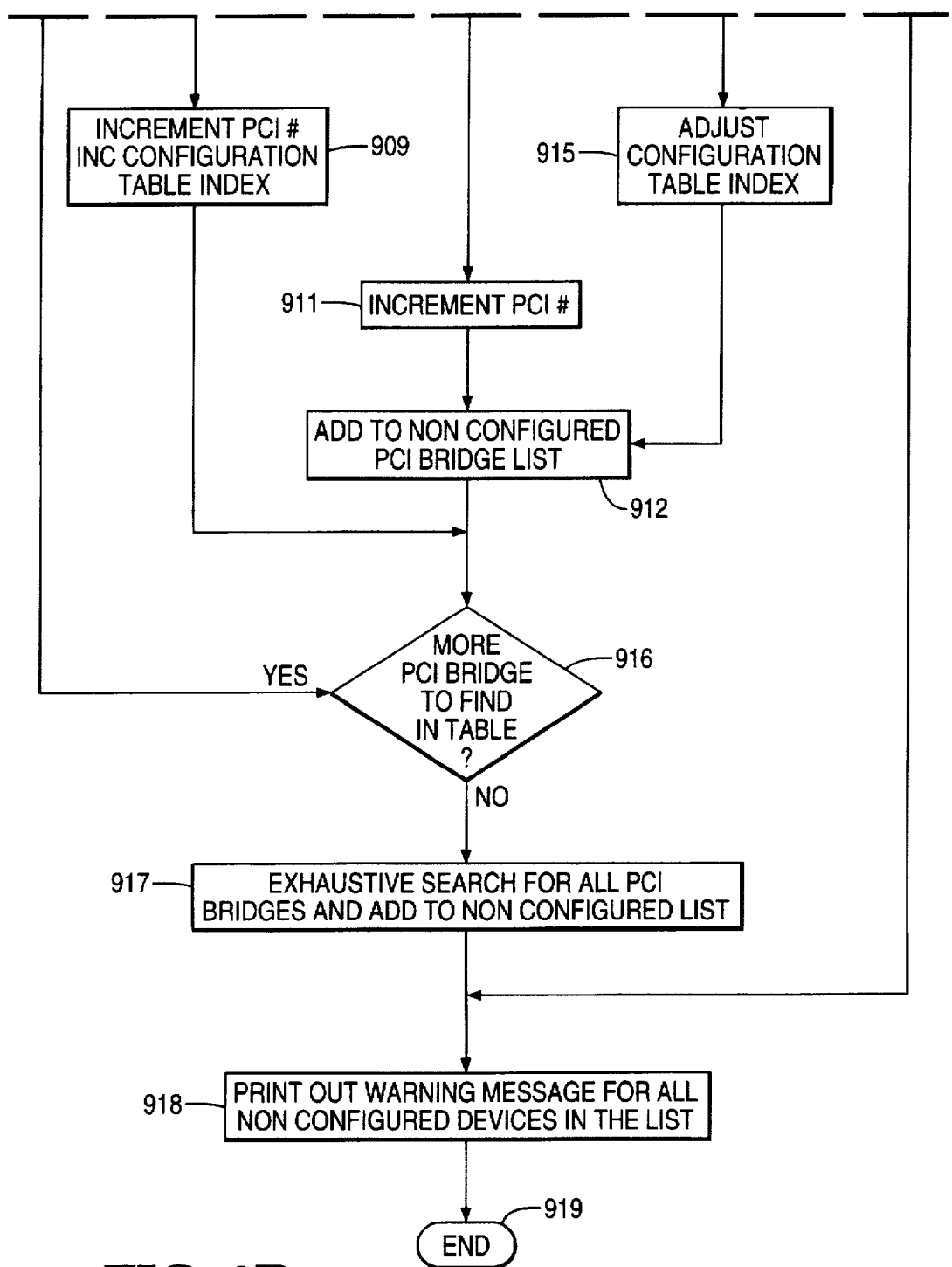

A flow chart illustrating the operation of the PCI Configuration init routine, PCI_Init ( ), is shown in FIG. 9. A description of the steps shown in the flow chart of FIGS. 9A and 9B is provided below.

| Step Number | Description of Operation |
|---|---|
| 901 | Start |
| 902 | Read the current PCI Bus Mapping Table into memory. |
| 903 | Initialize Logical-to-Physical Map by copying the first entry of the PCI Bus Mapping Table (known to be PCI Bus 0). Set PCI# to 1. Set PCI Bus Mapping Table Index to 1. |
| 904 | Copy PCI Bus Mapping Table (PCI Bus Mapping Table Index) Parent and Slot into Bridge to Find Structure. |
| 905 | Search slot by slot to find the next PCI Bridge up to and including the Bus and Slot in the Bridge to Find Structure, but not beyond this point. |
| 906 | Check to see if a PCI Bridge was found. |
| 907 | Check to see if the Bridge found was equal to the Bridge copied from the PCI Bus Mapping Table. |
| 908 | If it is the same Bridge, add it to the Logical-to-Physical Map. |
| 909 | Increment the PCI # and the PCI Bus Mapping Table Index. |
| 910 | If the Bridge was not equal to the Bridge to Find Structure then an inserted Bridge has been encountered. Increment all Physical# and Parent Bus # in the current PCI Bus Mapping Table that are greater than or equal to the current PCI# from the current PCI Bus Mapping Table Index to the end of the table. |
| 911 | Increment the current PCI#. |
| 912 | Add the inserted Bridge to the Non Configured Bridge list. |
| 913 | If no PCI bridge was found at the expected location in the Bridge to Find Structure, then remove all bridges that were children of the missing parent bridge. Subtract the number of removed bridges from all Physical# and Parent Bus # in the current PCI Bus Mapping Table that are greater than or equal to the current PCI# from the current PCI Bus Mapping Table Index to the end of the table. |
| 914 | Check to see if all possible Busses and Slots have been searched. |
| 915 | Add the number of removed bridges to PCI Bus Mapping Table Index. |
| 916 | Check to see if all Configuration entries in the PCI Bus Mapping Table have been searched for. |
| 917 | Complete an exhaustive search for any other added PCI Busses and add them to the Non Configured List. |
| 918 | Print out a warning List of Non Configured PCI Busses. |
| 919 | End |

Pseudo Code

```
Init( )

CurrentConfigurationTable= GetCurrentConfiguration()
    Initialize PCI Bridge Number to 0
    Initialize Search From Here structure
    Set the first entry in the Physical to Logical for Bridge-I/O Bus 0
    Increment the PCI Bridge Number
    Increment the CurrentConfigurationTable_Index
    while there are more bridges to find
        copy CurrentConfigurationTable[CurrentConfigurationTable_Index] into Next Bridge to
    find structure
        Bridge Found structure = inclusive search for bridge(Search from here, to Next Bridge to
    find, PCI Bridge Number)
            if Bridge to find is not present
                Adjust CurrentConfigurationTable Bridge(s) have been removed ( )
            else if bridge found is not equal to Bridge to find ( we found a bridge inserted before
    Bridge to find )
                Adjust CurrentConfigurationTable Bridge has been inserted ( )
                add additional bridge to NonConfiged table
                Increment PCI Bridge number
            else ( found the bridge to find )
                add entry to Physical to Logical map table
                Increment CurrentConfigurationTable_Index
                Increment PCI Bridge number
    end while
    if there are more slots and busses to search
        complete an exhaustive search for bridges
        if bridge found
            add bridge to NonConfiged table
        endif
    endif
    for all NonConfiged bridges found
        print out warning message
        if there is a NonConfigured bridge in the system
            give the option to run the PCI Configuration Utility
Adjust CurrentConfigurationTable Bridge(s) have been removed( )

save current CurrentConfigurationTable_Index
    count the Missing_number of bridges that were configured off missing bridge
    add all missing bridges to Nonconfiged table
    while not at end of CurrentConfigurationTable
        Subtract Missing_number from
```

```
            CurrentConfigurationTable[CurrentConfigurationTable_Index ].PCI Number
                 if CurrentConfigurationTable[CurrentConfigurationTable_Index ].Parent Bus Number>=
         PCI Bridge Number
                     Subtract Missing_number from
            CurrentConfigurationTable[CurrentConfigurationTable_Index ].Parent Bus#
                 Increment CurrentConfigurationTable_Index
            restore CurrentConfigurationTable_Index
            Add Missing_number to CurrentConfigurationTable_Index
   Adjust CurrentConfigurationTable Bridge has been inserted ( )

save current CurrentConfigurationTable_Index
       while not at end of CurrentConfigurationTable
            Increment CurrentConfigurationTable[CurrentConfigurationTable_Index ].PCI Number
            if CurrentConfigurationTable[CurrentConfigurationTable_Index ].Parent Bus Number>=
       PCI Bridge Number
                     Increment CurrentConfigurationTable[CurrentConfigurationTable_Index ].Parent
       Bus#
            Increment CurrentConfigurationTable_Index
       restore CurrentConfigurationTable_Index
   InclusiveSearchForBridge (From PCI Bridge, Next Bridge to find, PCI Number)

Initialize All Possible Slots Searched = FALSE
       Initialize Bridge Found = FALSE
       Initialize Bridge Found structure = 0
       while (Not All Possible Slots Searched and
                           Bridge not Found and
                                (From Bus and Slot to search from <= to Find Bus and Slot))
            If PCI Device(From Bus and Slot ) Equal PCI Bridge
                 Bridge Found = TRUE
                 Bridge Found structure.PCI = PCI Number
                 Bridge Found structure.Parent Bus = From PCI Bridge Bus
                 Bridge Found structure.Slot = From PCI Bridge Slot
                 Increment From PCI Bridge Level
                 From PCI Bridge[From PCI Bridge Level].ParentBus=PCI Number
                 From PCI Bridge[From PCI Bridge Level].Slot=First slot
            else
                 All Possible Slots Searched = Get next Bus and Slot (From PCI Bridge, PCI
       Number)
                     If NOT All Possible Slots Searched and From PCI Bridge Equal Peer
                           Bridge Found = TRUE
                           Bridge Found structure.PCI = PCI Number
                           Bridge Found structure.Parent Bus = From PCI Bridge Bus
                           Bridge Found structure.Slot = From PCI Bridge Slot
       end while
       return (Bridge Found structure)
   Get next Bus Slot (From PCI Bridge, PCI Number)

IF From PCI Bridge Slot Equal MAX SLOT
            IF From PCI Bridge Level Equal 0
                 From PCI Bridge Bus = PCI Number
                 From PCI Bridge Slot = First Slot
                 Search for next PEER
                 If No PEER Found
                           All Possible Slots Searched = TRUE
                 else
                           All Possible Slots Searched = FALSE
            else
                 Decrement From PCI Bridge Level
                 All Possible Slots Searched = Get next Bus and Slot (From PCI Bridge, PCI
       Number)
       else
            Increment From PCI Bridge Slot
       return (All Possible Slots Searched)
   Pseudo Code Structure Definitions ParentBus_andSlot    {
                                Parent_Number
                                Slot_Number
                            }
       Bridge_To_Find_Info  {
                                PCI_Number
                                ParentBus_andSlot
                            }
       Bridge_Found_Info    {
                                Return Code
                                PCI_Number
                                ParentBus_andSlot
                            }
       Search_From_Here     {
                                Level
```

```
                    ParentBus_andSlot[ MAX_PCI_LEVELS]
                    }
    NonConfig_Table[ MAX_BRIDGE_NUMBER]
    {
        PCI #
        ParentBus_andSlot
        Added_or_Deleted
    }
    Physical_to_Logical_Map[MAX_BRIDGE_NUMBER]
    {
        Physical number
        Logical number
    }
```

PCI_Open ( )
Description
This function will search for the presence of any PCI I/O Bus in the system.
Logical input parameters:
none
Return Codes
ENOERR if one or more PCI Busses are found.
ENXIO if no PCI Bus is found
PCI_Close ( )
Description
This function does nothing.
Logical input parameters:
none
Return Code
Always 0.
PCI_Ioctl( )
GetHardwareConfig
Description
This function will return the hardware configuration. This function returns the actual PCI Bus configuration as seen by the PCI Configuration Driver at start-of-day. The format returned will be in the PCI Bus Mapping Table format.
Logical input parameters:
none
Return Code
A pointer to a PCI_Bus_Mapping_Table structure.
GetLogicalToPhysicalMap
Description
This function return Logical to Physical Map. This function returns the actual Logical to Physical Map that device drivers use to initialize at start-of-day. The format returned will be in the Logical-to-Physical Map Table format.
Logical input parameters:
none
Return Code
A pointer to a Logical_to_Physical_Map structure.
GetPCIMappingTable ( )
Description
This function will return the PCI Bus Mapping Table. This function returns the initial PCI Bus configuration that is located in the PCI Configuration Driver space.c file. The format returned will be in the PCI Bus Mapping Table format.
Logical input parameters:
none
Return Code
A pointer to a PCI_Bus_Mapping_Table structure.
GetPCIBusNonConfigList ( )
Description
This function will return the list of PCI Bus found in the system but were not yet configured into the system. That is there was no entry in the space.c PCI Bus Mapping Table.
Logical input parameters:
none
Return Code
A pointer to a Unconfigured_PCI_Bus_Table structure.
Driver Interfaces ( )
These are the functions that all PCI Device drivers will use to get a Physical PCI Bus Number from a PCI Logical Bus Number or visa versa. And the Device drivers will also need to know what type the I/O bus is configured.
GetPhysicalBus (unsigned char Logical)
Description
This function will return a Physical PCI Bus number the corresponds to the passed in Logical PCI number found in the PCI Bus Mapping Table.

| Logical input parameters: | |
|---|---|
| Logical | PCI Logical Bus number. |

Return Code
unsigned char Physical—the Physical PCI Bus Number.
GetLogicalBus (unsigned char Physical)
Description
This function will return a Logical PCI Bus number the corresponds to the passed in Physical PCI number found in the PCI Bus Mapping Table.

| Logical input parameters: | |
|---|---|
| Physical | PCI Physical Bus number. |

Return Code
unsigned char Logical—the Logical PCI Bus Number.
GetBusType (unsigned char Logical)
Description
This function will return a PCI Bus Type number that corresponds to the passed in Logical PCI number found in the PCI Bus Mapping Table.

| Logical input parameters: | |
|---|---|
| Logical | PCI Logical Bus number. |
| PCI Bus Types: | |
| PCI-Peer | 0 |
| PCI-to-PCI Bridge | 1 |
| EISA | 2 |
| ISA | 3 |
| MCA | 4 |
| SMCA | 5 |

Return Code unsigned char Type—the Type of PCI Bus located at the Logical PCI Bus Number.

PCI Configuration Driver Table Definition

PCI Bus Mapping Table

| PCI Bus Mapping Table | | | | |
|---|---|---|---|---|
| Logical Bus Number | Physical Bus Number | Parent Bus Number | Slot Number | Bus Type |
| 0 | 0 | 0 | 0 | PEER |
| 1 | 1 | 0 | 0 | PEER |
| 2 | None | 0 | 0 | EISA |

```
Typedef struct PCI_Bus_Mapping_Table {
                  unsigned char Logical Number
                  unsigned char Physical Number
                  unsigned char Parent Number
                  unsigned char Slot Number
                  unsigned char Type
                  }
PCI Bus Types:
       PCI-Peer                  0
       PCI-to-PCI Bridge         1
       EISA                      2
       ISA                       3
       MCA                       4
       SMCA                      5
```

Logical-to-Physical Map

| Logical-to-Physical Map Table | | |
|---|---|---|
| Array index = Logical Number | Bus Type | Physical Number |
| 0 | PCI-Peer | 0 |
| 1 | PCI-Peer | 1 |
| 2 | EISA-Bus | None |

```
Typedef struct Logical_to_Physical_Map {
                  unsigned char Logical Number
                  unsigned char Type
                  unsigned char Physical Number
                  }
PCI Bus Types:
       PCI-Peer                  0
       PCI-to-PCI Bridge         1
       EISA                      2
       ISA                       3
       MCA                       4
       SMCA                      5
```

Unconfigured PCI Bus Table

| Unconfigured PCI Bus Table | | | |
|---|---|---|---|
| PCI# | Parent Bus Number | Slot Number | Add or Deleted |

```
Typedef struct Unconfigured_PCI_Bus_Table {
                  unsigned char Physical Number
                  unsigned char Parent Number
                  unsigned char Slot Number
                  unsigned char Added_or_Deleted
                  }
Define Types
       Added                     0
       Deleted                   1
```

PCI Configuration Utility

The PCI Configuration Utility provides a simple means to update the PCI Bus Mapping Table whenever the PCI Bus configuration changes. Whenever a controller is plugged into a PCI expansion slot that implements its own local PCI bus, this utility should be run to configure the new PCI bus and kernel relink, and the system rebooted. This will allow device drivers to obtain the correct logical/physical mapping. Details of the PCI Configuration Utility /sbin/pci_config are provided below.

Name pci_config—Configure PCI busses and devices.

Synopsis pci_config [-hlmu] [-a logical physical parent slot type] [-r logical] [-f file]

Description

The pci_config command is used to change the PCI Bus Configuration as specified by the PCI Bus Mapping Table which is located in the file /etc/conf/pack.d/pci/space.c. The PCI Bus Mapping Table maps physical PCI bus numbers to logical bus numbers. It is the logical bus numbers which are used by drivers to define minor numbers. When the system is booted, the PCI Configuration Driver compares the PCI Bus Mapping Table to the current hardware configuration and builds a Logical to Physical Map Table. Drivers use this table to obtain physical PCI bus numbers given a logical number. The Logical to Physical Map will return the correct PCI Bus number even if the Bus number is changed via a PCI Bus configuration change. Newly added or removed busses are placed in the Unconfigured PCI Bus Table. Unconfigured busses need to be resolved, kernel relinked, and rebooted for the new configuration to be used.

-h Get hardware configuration. This option returns the actual PCI Bus configuration as seen by the PCI Configuration Driver at start-of-day. The format returned will be in the PCI Bus Mapping Table format.

-l Get Logical to Physical Map. This option returns the actual Logical to Physical Map that device drivers use to initialize at start-of-day. The format returned will be in the Logical-to-Physical Map Table format.

-m Get PCI Bus Mapping Table. This option returns the PCI Bus Mapping Table as linked into the kernel. The format returned will be in the PCI Bus Mapping Table format.

-u Get Unconfigured Busses. This option returns all unconfigured PCI busses (added or removed) in the Unconfigured PCI Bus Table format.

-a Add an entry to the PCI Bus Mapping Table. This option allows an entry to be added to the PCI Bus Mapping Table in the file /etc/conf/pack.d/pci/space.c. Each entry must the following fields, logical is the logical bus number which will be used to map to minor numbers, physical is the PCI Bus number, parent is the PCI bus number of the bus' parent, slot is the PCI device number of the PCI bridge device located on the parent's PCI bus, and type specifies the type of bus (PCI_PEER, PCI_BRIDGE, EISA, ISA, MCA). The kernel requires to be relinked and rebooted for the new values to take effect.

-r Remove an entry from the PCI Bus Mapping Table. This option allows an entry to be removed from the PCI Bus Mapping Table in the file /etc/conf/pack.d/pci/space.c. The entry associated with the logical bus number as specified by logical is removed.

-f Send output data to a file as specified by file.

Files

/etc/conf/pack.d/pci/space.c

It can thus be seen that there has been provided by the present invention a new and useful bus addressing scheme for a computer system including multiple PCI busses. The bus addressing scheme assigns a constant logical bus number to each physical bus within the system. Addressing the busses by their logical bus numbers avoids errors which would otherwise result when physical bus numbers change as a result of the addition or removal of buses within the computer system.

Although the presently preferred embodiment of the invention has been described, it will be understood that various changes may be made within the scope of the appended claims.

What is claimed is:

1. A method for addressing bus agents within a computer system supporting dynamic I/O bus configurations, said computer system assigning a physical bus number to each bus within said computer system; said method comprising the steps of:

assigning a distinct logical bus number to each bus within said computer system, the logical bus number assigned to each bus remaining unchanged following a bus configuration alteration producing a change in the physical bus numbers assigned to said busses; and generating an address value for each one of said bus agents, said address value including a portion identifying the logical bus number of the bus to which said one of said bus agents is connected.

2. The method for addressing bus agents within a computer system supporting dynamic I/O bus configurations in accordance with claim 1, wherein:

said computer system determines an actual physical bus configuration during system boot-up; and said step of assigning a distinct logical bus number to each bus within said computer system comprises the steps of:

generating and saving a bus mapping table including a field identifying the physical bus numbers of each bus in said computer system and a field identifying the logical bus number of each bus in said computer system; and comparing during system boot-up, the actual physical bus configuration of said computer system with the physical bus numbers contained within said bus mapping table to generate a logical-to-physical map table for translating logical bus numbers to physical bus numbers.

3. The method for addressing bus agents within a computer system supporting dynamic I/O bus configurations in accordance with claim 2, further comprising the step of:

updating said bus mapping table following a bus configuration alteration producing a change in the physical bus numbers assigned to said busses, the logical bus number assigned to each bus remaining in said table following said bus configuration alteration remaining unchanged.

4. The method for addressing bus agents within a computer system supporting dynamic I/O bus configurations in accordance with claim 3, wherein said bus configuration alteration comprises an addition of an additional bus to said computer system.

5. The method for addressing bus agents within a computer system supporting dynamic I/O bus configurations in accordance with claim 3, wherein said bus configuration alteration comprises a removal of an existing bus within said computer system.

6. A method for assigning bus numbers to busses within a computer system supporting dynamic I/O bus configuration following the addition or removal of a bus from said system; wherein said computer system determines an actual physical bus configuration during system boot-up; said method comprising the steps of:

generating and saving a bus mapping table including a field identifying a physical bus number of each bus in said computer system and a field identifying a logical bus number of each bus in said computer system; and comparing during system boot-up, the actual physical bus configuration of said computer system with the physical bus numbers contained within said bus mapping table to generate a logical-to-physical map table.

7. The method according to claim 6, wherein:

said computer system includes a bus agent connected to one of said busses within said computer system; and said method further comprising the step of generating an address value for said bus agent, said address value including a portion identifying the logical bus number of the bus to which said bus agent is connected.

8. The method for addressing bus agents within a computer system supporting dynamic I/O bus configurations in accordance with claim 6, further comprising the step of:

updating said bus mapping table following a bus configuration alteration producing a change in the physical bus numbers assigned to said busses, the logical bus number assigned to each bus remaining in said table following said bus configuration alteration remaining unchanged.

9. The method for addressing bus agents within a computer system supporting dynamic I/O bus configurations in accordance with claim 8, wherein said bus configuration alteration comprises an addition of an additional bus to said computer system.

10. The method for addressing bus agents within a computer system supporting dynamic I/O bus configurations in accordance with claim 8, wherein said bus configuration alteration comprises a removal of an existing bus within said computer system.

11. A method for addressing bus devices within a computer system having multiple Peripheral Component Interconnect (PCI) busses and supporting dynamic I/O bus configurations, said computer system assigning a physical bus number to each bus within said computer system during system boot-up; said method comprising the steps of:

assigning a distinct logical bus number to each bus within said computer system, the logical bus number assigned to each bus remaining unchanged following a bus configuration alteration producing a change in the physical bus numbers assigned to said busses; and generating a minor number for each one of said bus devices, said minor number including a portion identifying the logical bus number of the bus to which said one of said bus devices is connected.

12. The method in accordance with claim 11, wherein said step of assigning a distinct logical bus number to each bus within said computer system comprises the steps of:

generating and saving a bus mapping table including a field identifying the physical bus numbers of each bus in said computer system and a field identifying the logical bus number of each bus in said computer system; and comparing during system boot-up, the current physical bus numbers assigned by said computer system to said busses during system boot-up to the physical bus numbers contained within said bus mapping table to generate a logical-to-physical map table for translating logical bus numbers to current physical bus numbers.

13. The method in accordance with claim 12, further comprising the step of:

updating said bus mapping table following a bus configuration alteration producing a change in the physical bus numbers assigned to said busses, the logical bus number assigned to each bus remaining in said table following said bus configuration alteration remaining unchanged.

* * * * *